United States Patent
Horley et al.

(10) Patent No.: US 11,307,855 B2
(45) Date of Patent: Apr. 19, 2022

(54) REGISTER-PROVIDED-OPCODE INSTRUCTION

(71) Applicant: Arm Limited, Cambridge (GB)

(72) Inventors: John Michael Horley, Hauxton (GB); Simon John Craske, Cambridge (GB)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 17/096,014

(22) Filed: Nov. 12, 2020

(65) Prior Publication Data
US 2021/0157592 A1 May 27, 2021

(30) Foreign Application Priority Data
Nov. 26, 2019 (GB) .................................. 1917199

(51) Int. Cl.
*G06F 9/30* (2018.01)

(52) U.S. Cl.
CPC ...... *G06F 9/30101* (2013.01); *G06F 9/30145* (2013.01)

(58) Field of Classification Search
CPC .......................... G06F 9/30145; G06F 9/30101
See application file for complete search history.

(56) References Cited

U.S. PATENT DOCUMENTS

| | | | |
|---|---|---|---|
| 4,293,907 A | 10/1981 | Huang et al. | |
| 2012/0017067 A1* | 1/2012 | Sankaran | G06F 9/3013 712/24 |
| 2013/0159676 A1 | 6/2013 | Muff et al. | |
| 2016/0357563 A1* | 12/2016 | Van Dalen | G06F 9/30032 |

OTHER PUBLICATIONS

Search Report for GB1917199.0, dated Aug. 21, 2020, 4 pages.
Robert Bedichek, "Some Efficient Architecture Simulation Techniques," Proceedings of the Winter 1990 USENIX Conference, Jan. 22-26, 1990, 12 pages.

* cited by examiner

*Primary Examiner* — Zachary K Huson
(74) *Attorney, Agent, or Firm* — Nixon & Vanderhye P.C.

(57) ABSTRACT

Instructions have an opcode and at least one data operand, the opcode identifying a data processing operation to perform on the at least one data operand. For a register-provided-opcode instruction specifying at least one source register, at least part of the opcode is a register-provided opcode represented by a first portion of data stored in said at least one source register of the register-provided-opcode instruction, and the at least one data operand comprises data represented by a second portion of the data stored in the at least one source register. The register-provided opcode is used to select between different data processing operations supported for the same instruction encoding of the register-provided-opcode instruction.

20 Claims, 9 Drawing Sheets

| type of instruction | opcode indicated by: | data operands indicated by: |
|---|---|---|
| architecturally - mandated instruction | opc, [#imm] | [#imm], Rd, Rn, Rm, [NZCV] |
| custom instructions (non-register-provided-opcode instruction) *distinguished by [opc, #imm]* | opc, #imm (all or part) *(opc distinguishes from architecturally mandated instruction)* | #imm (part or none) Rd, Rn, Rm, NZCV |
| custom instructions (register-provided-opcode instruction) | opc, #imm, (all or part) first portion of register data stored in one or more of: Rd, Rn, Rm, NZCV | #imm (part or none) second portion of register data stored in Rd, Rn, Rm, NZCV |

FIG. 5

REGISTER-PROVIDED-OPCODE INSTRUCTION

This application claims priority to GB Patent Application No. 1917199.0 filed 26 Nov. 2019, the entire contents of which is hereby incorporated by reference.

The present technique relates to the field of data processing.

A processor may execute instructions according to a particular instruction set architecture (ISA) supported by the processor. The ISA may prescribe certain features which the processor is required to provide to ensure that program code written according to the ISA will function correctly when executing on the processor. For example, the ISA may specify instruction encodings for a given set of instructions, which are to be used to represent corresponding data processing operations to be performed. A manufacturer of a particular processor implementation supporting the ISA can then include appropriate circuit logic provided in hardware to support the data processing operations required to be performed by the instructions defined according to the ISA.

At least some examples provide an apparatus comprising: a plurality of registers to store data; processing circuitry to perform data processing using data obtained from the registers; and an instruction decoder to decode an instruction specifying an opcode and at least one data operand, to control the processing circuitry to perform a data processing operation identified by the opcode on the at least one data operand, to generate a result value to be written to a destination register; in which for a register-provided-opcode instruction specifying at least one source register: at least part of the opcode is a register-provided opcode represented by a first portion of data stored in said at least one source register of the register-provided-opcode instruction; the at least one data operand comprises data represented by a second portion of the data stored in the at least one source register; in response to the register-provided-opcode instruction, the instruction decoder is configured to control the processing circuitry to select, based on at least the register-provided opcode, one of a plurality of different data processing operations supported for the same instruction encoding of the register-provided-opcode instruction; and said plurality of different data processing operations include at least two different data processing operations which are each capable, for at least a subset of possible input values for said at least one data operand, of generating the result value with a different value or a different data format to said at least one data operand.

At least some examples provide a data processing method comprising: decoding an instruction specifying an opcode and at least one data operand, to control processing circuitry to perform a data processing operation identified by the opcode on the at least one data operand, to generate a result value to be written to a destination register; and when the decoded instruction is a register-provided-opcode instruction specifying at least one source register: at least part of the opcode is a register-provided opcode represented by a first portion of data stored in the at least one source register of the register-provided-opcode instruction; the at least one data operand comprises data represented by a second portion of the data stored in the at least one source register; in response to the register-provided-opcode instruction, the processing circuitry selects, based on at least the register-provided opcode, one of a plurality of different data processing operations supported for the same instruction encoding of the register-provided-opcode instruction; and said plurality of different data processing operations include at least two different data processing operations which are each capable, for at least a subset of possible input values for said at least one data operand, of generating the result value with a different value or a different data format to said at least one data operand.

At least some examples provide a computer program for controlling a host data processing apparatus to simulate processing of a target program by target processing circuitry, the computer program comprising: register emulating program logic to maintain a register emulating data structure emulating a plurality of registers of the target processing circuitry; and instruction decoding program logic to decode an instruction of the target program specifying an opcode and at least one data operand, to control the host data processing apparatus to perform a data processing operation identified by the opcode on the at least one data operand, to generate a result value to be written to part of the register emulating data structure corresponding to a destination register of said plurality of registers; in which for a register-provided-opcode instruction specifying at least one source register: at least part of the opcode is a register-provided opcode represented by a first portion of data corresponding to the at least one source register of the register-provided-opcode instruction; the at least one data operand comprises data represented by a second portion of the data corresponding to the at least one source register; in response to the register-provided-opcode instruction, the instruction decoding program logic is configured to control the host data processing apparatus to select, based on at least the register-provided opcode, one of a plurality of different data processing operations supported for the same instruction encoding of the register-provided-opcode instruction; and said plurality of different data processing operations include at least two different data processing operations which are each capable, for at least a subset of possible input values for said at least one data operand, of generating the result value with a different value or a different data format to said at least one data operand.

At least some examples provide a computer-readable storage medium storing the computer program described above. The storage medium may be a transitory storage medium or a non-transitory storage medium.

Further aspects, features and advantages of the present technique will be apparent from the following description of examples, which is to be read in conjunction with the accompanying drawings, in which:

FIG. 1 schematically illustrates an example of a data processing apparatus;

FIG. 5 illustrates different types of instructions, including a register-provided-opcode instruction;

Figure 1:
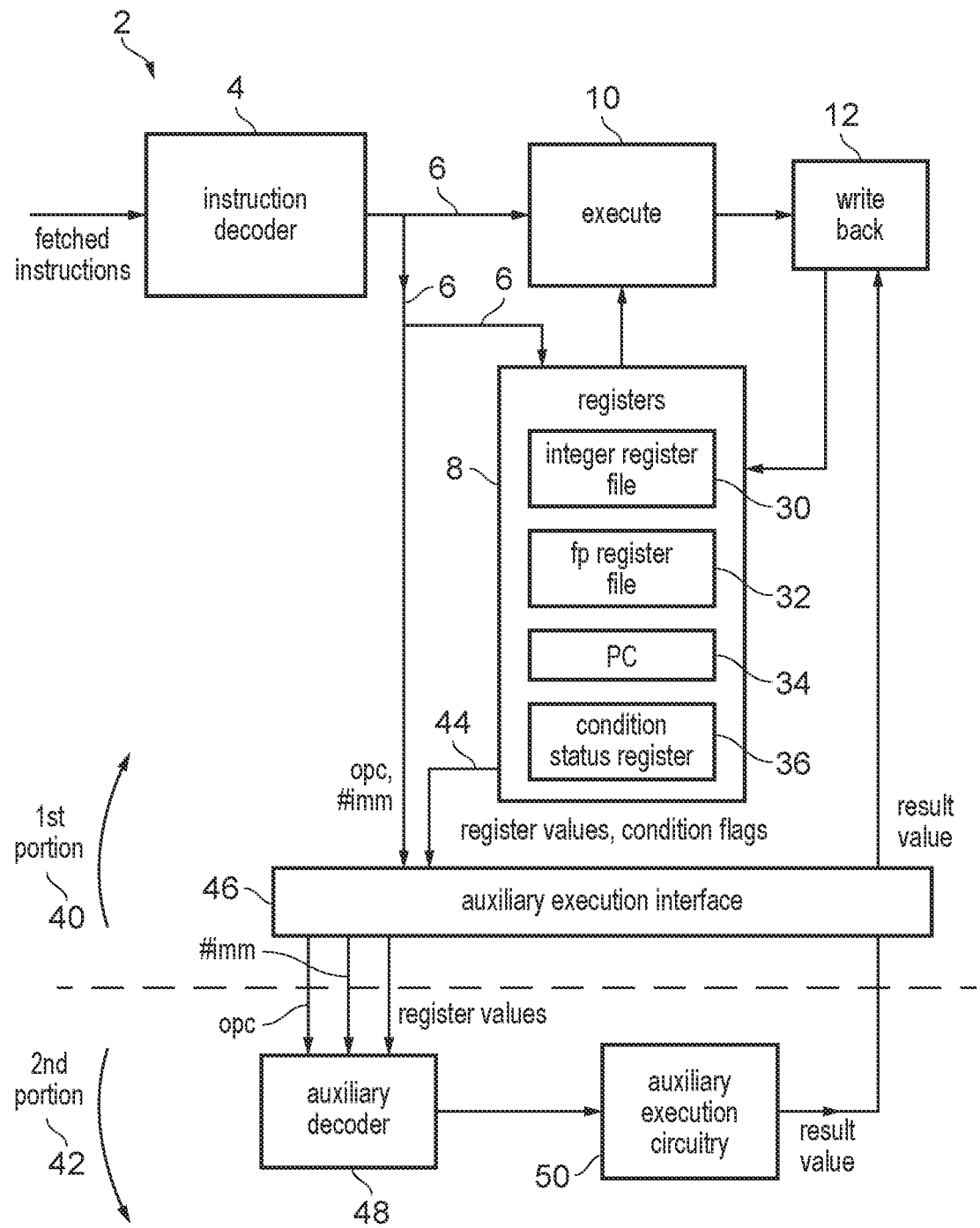

An apparatus has a number of registers to store data, processing circuitry to perform data processing using data obtained from the registers, and an instruction decoder to decode an instruction specifying an opcode and at least one data operand, to control the processing circuitry to perform a data processing operation identified by the opcode on the at least one data operand, to generate a result value to be written to a destination register.

The opcode of the instruction represents the particular data processing operation that is to be performed on the at least one data operand. With typical instruction set architectures, the opcode of an instruction is defined by a certain subset of bits within the instruction encoding. The data operands on which the operation is to be performed may be represented either by an immediate value within the instruction encoding or by data stored in at least one source register. Instruction encoding space can often be at a premium when designing an instruction set architecture. There may be a limited number of bits available for encoding the opcode directly within the instruction encoding. While one option to enable a greater range of data processing operations to be encoded could be to expand the overall length of each instruction so that more opcode bits can be accommodated, this would require wider signal paths for carrying the instructions on wired signal paths within the processing hardware and extra space in memory for storing program code, which may be undesirable as it may increase circuit area and power consumption.

In the techniques discussed below, a register-provided-opcode (RPO) instruction is provided which specifies at least one source register. For the register-provided-opcode instruction, at least part of the opcode is a register-provided opcode represented by a first portion of data stored in the at least one source register specified by the RPO instruction. A second portion of the data stored in the at least one source register represents the at least one data operand of the RPO instruction. In response to the RPO instruction, the instruction decoder may control the processing circuitry to select, based on at least the register-provided opcode, one of a number of different data processing operations supported for the same instruction encoding of the RPO instruction. Those different data processing operations may include at least two different data processing operations which are each capable, for at least a subset of possible input values of the at least one data operand, of generating the result value with a different value or a different data format to the at least one data operand.

It may seem counter intuitive that part of the register data stored in a register should be used as the opcode for selecting the type of data processing operation to be performed. One would think that having to read a register to identify the type of instruction would delay handling of the instruction, and this is quite contrary to the conventional approach of using the registers to provide the data operands for the instruction and using the instruction encoding to provide the opcode. However, the inventors recognise that for some types of instruction the number of opcode bits in the instruction encoding may be limited and the range of different data processing operations desired to be supported may be greater than the number of different encodings for the opcode bits within the instruction encoding. By using a register to provide additional opcode bits this can increase the range of different data processing operations that can be supported, which can be beneficial for performance because it may allow some operations which would otherwise require multiple instructions to be executed to instead be performed using a single instruction.

The at least one source register of the RPO instruction could in some examples be separately specified from the destination register, so that the source values for the instruction do not include the previous value stored in a destination register before the result value of the instruction is written to the destination register. In other examples, the previous value in the destination register could itself be used as a source operand for the instruction, and so in this case the at least one source register could include the destination register. Hence, in some instances the RPO instruction could only specify one source register which may act as both source register and destination register. Other types of instructions could specify one source register which is a separate register from the destination register, so that the instruction is a non-destructive instruction which does not overwrite the source operand. Other variants of the instruction could specify multiple source registers, which may either include the destination register or may exclude the destination register. Hence, references to source registers in this application may, unless specified otherwise, include the destination register.

The register-provided opcode and the at least one data operand are represented by first and second portions of the data stored in the at least one source register. In some examples, the second portion of the data may correspond to an entirely separate set of one or more source registers from the first portion of the data stored in a different set of one or more source registers. In this case, there may be no sharing of data and opcode within the same register specified as a source register by the RPO instruction.

Alternatively, for some variants of the RPO instruction, the data value stored in a particular source register could have part of that data considered to be within the first portion of data representing the opcode and a separate part of the data stored in the same register being considered to be part of the second portion of the data which represents the at least one data operand. Hence, some registers could be split between the opcode representing parts and the data operand representing parts, depending on the particular implementation chosen. For example, if the number of additional opcode bits needed for a particular implementation is less than the number of bits in one register then it may be possible to use remaining bits to represent a data operand. Similarly, if the data operand width for a given operation is less than the register width then the remaining bits in the register could be exploited to provide additional opcode bits.

As mentioned above, the register-provided opcode is used to select between two or more different data processing operations which are supported by the processing circuitry in response to an instruction having an identical instruction encoding of the RPO instruction. Although some implementations may use a single bit of the register-provided opcode to select between two alternative data processing operations for the same encoding, the technique can be particularly useful if there are three or more different data processing operations supported for the same instruction encoding of the RPO instruction, with the particular operation to perform being selected based on the register-provided opcode. More particularly, with a register-provided opcode having N bits then up to $2^N$ different data processing operations can be supported for the same instruction encoding. It will be appreciated that a number of different types of RPO instruction having different instruction encodings (e.g. with different values for the opcode portion represented in the instruction encoding itself) could be supported by the instruction decoder and the processing circuitry, with each of those different types of RPO instruction having a different set of data processing operations which can be selected based on the register-provided opcode of that instruction.

The different data processing operations supported for a given type of RPO instruction include at least two (and possibly more as discussed above) different data processing operations which are each capable of generating a value for the result value which is a different value or is in a different data format to the at least one data operand from which that result was generated. Hence, the different data processing operations may not merely comprise a no-operation function which leaves the result the same, or a register move function which merely moves a data value from one register to another without changing its value or format. Although the RPO instruction could further be made conditional so that whether or not the selected one of the two or more different data processing operations is performed at all is made conditional on some condition status value, so that it can sometimes lead to an outcome which leaves the result value having the same value as the corresponding data operand, there are still at least two alternative outcomes of the instruction which correspond to different data processing operations capable of changing the data operand to generate the result, which are selected between based on the register-provided opcode. Hence, rather than the register-provided opcode merely being used to conditionally select whether or not the data processing operation is performed, the register-provided opcode of the RPO instruction is actually used to select between completely different data processing operations applied to the at least one data operand to generate the result value, similar to the way in which an instruction decoder would use opcode bits in an instruction encoding to select between different types of data processing operations.

The different data processing operations supported for a given encoding of the RPO instruction can vary in different ways. In one example the at least two different data processing operations comprise at least two different transformation functions for generating the result value from the at least one data operand. For example the at least two different transformation functions could comprise different subsets or combinations of one or more of:
- at least one arithmetic operator (e.g. add, subtract, multiply, divide, multiply-add, or square root, etc., or combinations of these);
- at least one logical operator (e.g. AND, NOT, OR, NOR, XOR, NAND, etc., or combinations of these);
- at least one shift operator (e.g. left arithmetic shift, right arithmetic shift, left logical shift, or right logical shift), and
- at least one data format conversion operator (e.g. any conversion between different integer, fixed-point or floating-point number formats).

Hence, different options selectable as the data processing operations to perform for different values of the register-provided opcode could vary in terms of which sequences of arithmetic, logical, shift or data format conversion operators are applied to the at least one data operand to generate the result.

Alternatively, or in addition to selecting between alternative transformation functions, the register-provided opcode could also be used to select which of at least two register files is used to provide at least one source register for storing the at least one data operand of the RPO instruction or the destination register for storing the result value. In such an implementation then one of the source registers could be from a certain default register file which is used regardless of the value of the register-provided opcode, so that the register in the default register file could be read to obtain the register-provided opcode in the first place, but then once the register-provided opcode has been read then the value of the data stored in that register could be used to select whether one or more other source registers and/or the destination register are to be selected from a first register file or a second register file. For example the different register files could correspond to registers for storing different types of operands. For example the at least two register files could include two or more of: an integer register file for storing integer operands, a floating-point register file for storing floating-point operands, and a vector register file for storing vector operands. Hence, by using the register-provided opcode to select which register file to use for the data operand or the destination register, this avoids needing to use bits within the instruction encoding itself to represent this, leaving more encoding free to represent the particular data transformation that is required.

The registers may include system registers, which have certain architecturally-defined functions, such as representing the program counter which represents the current point of execution in the program being executed, exception handling registers for controlling taking and returning from exceptions, and various mode indicating registers or status registers which indicate a current mode or operating state of the processor. Also, the registers may include general purpose registers which do not have any particular architecturally-defined functionality, but can generally be used by instructions to store operands and results of the processing operations to be performed.

In some examples the register-provided opcode may be represented by data stored in at least part of a general purpose register specified as one of the at least one source register of the RPO instruction. It may seem counter intuitive that the data in a general purpose register will be used as an opcode, since conventionally the general purpose registers would be used for providing the data operands for instructions, such as the data values to be processed by arithmetic instructions, or operands for generating addresses of memory access instructions. However, by using the data in the register to provide additional opcode bits this expands the number of possible data processing operations that can be represented by a given instruction encoding, opening up support for additional operations which otherwise would have to be performed using a sequence of multiple instructions.

In some examples the data stored in the general purpose register could be used partly to represent the register-provided opcode and partly to represent a data operand, so that a single register is split between both purposes.

In other examples the register-provided opcode instruction may specify two or more source registers (which could optionally include the destination register as discussed above for a destructive encoding of the instruction). At least one source register can be used to represent the data operand, but a separate general purpose register may be used to provide the register-provided opcode, so that the general purpose register providing the register-provided opcode does not provide any part of the at least one data operand for the instruction. Hence, the at least one data operand may be independent of data in the general purpose register used to provide the register-provided opcode. This approach of splitting which registers are used to represent the register-provided opcode and which registers are used to provide the data operands can make it much easier for compilers to compile program code using the RPO instruction, because when allocating which registers are to be used for representing the data operands the compiler does not need to take account of whether part of the register has to represent the opcode and so is not available for representing data. For example a compiler could choose to use a particular one of the general purpose registers as providing the opcode for RPO instructions, and select the registers used to provide the data operands from among the remaining set of registers, to make the compiler's register allocation decisions simpler.

One may question why, if it is possible to spare the bits of the instruction encoding which identify the general purpose register which provides the register-provided opcode, those bits could not instead just be used to directly identify the register-provided opcode. However, typically the number of general purpose registers may be relatively limited so that only a certain number of bits (e.g. four or five) within the instruction encoding may be used to specify the general purpose register, so using the data within that general purpose register to provide the register-provided opcode may allow for a greater number of opcode bits and hence a wider range of data processing operations which can be represented.

Another approach can be that a condition status register is provided and is used by at least one variant of the RPO instruction to provide the register-provided opcode. The condition status register may store at least one condition indicator, which can be used by conditional instructions to control the processing circuitry to decide whether to perform a conditional operation, conditional on whether the at least one condition indicator satisfies a test condition specified by the conditional instruction. The at least one condition indicator would therefore normally simply control whether a conditional operation is performed or not, but for the RPO instruction the bits associated with the at least one condition indicator can be passed to the instruction decoder as additional opcode bits so that a more complex selection between different data processing operations (e.g. different processing transformation functions) can be performed based on the at least one condition indicator for those instructions which do not otherwise require conditional functionality, so as to effectively expand the width of the opcode for the RPO instruction and allow a greater range of operations to be represented.

While, compared to using a general purpose register to provide the register-provided opcode, using the condition status register may provide fewer additional opcode bits and so may not support as large a range of different data processing operations, one advantage of using the at least one condition indicator to provide the additional opcode bits is this can be easier for a compiler to make use of. This is because many compilers are written to try to make the widest possible use of the general purpose registers for representing the data operands, as register pressure means that there are typically fewer general purpose registers available than the number of different variables which might wish to be used within a program, and so once all the general purpose registers have already been used then if another variable is needed then this may require the data from a previously used register to be saved to memory to make space for the new variable. If the previously saved variable is then needed again in future it would need to be loaded back into the registers replacing another variable, and so this spilling of register data to memory and filling back into the registers increases the memory bandwidth consumed and hence reduces performance. Hence, to try to maintain as high performance as possible it can be beneficial if the compiler is able to make use of as many general purpose registers for storing data operands as possible. Hence, if the condition status indicators in the condition status register are sufficient to encode the number of different data processing operations desired for a given encoding of the RPO instruction, this can preserve the general purpose registers for being available for data operands, which can improve performance.

In some variants, all of the condition indicators in the condition status register could be used to provide the register-provided opcode. Alternatively, only a first subset of the condition indicators can be used to provide the register-provided opcode, with a remaining subset of the condition indicators being used as a data operand. In particular, if the RPO instruction is a conditional RPO instruction then for at least one of the two or more different data processing operations which can be selected based on the register-provided opcode, the data processing operation selected may be conditional on whether the remaining subset of the condition indicators satisfy a test condition specified by the conditional RPO instruction. Hence, again a processor designer may trade off the number of condition indicators which are needed for controlling any conditional operations for an instruction against which of those indicators can be used instead for representing part of the opcode, so that if a limited number of test conditions is needed, then fewer condition indicators could be used to provide the condition status used as a data operand and more of the condition indicator bits can be used to represent the register-provided opcode, so as to increase the number of different data processing operations which are available for selection in response to a single encoding of the RPO instruction.

The at least one condition indicator stored in the condition status register may represent properties of a result of an earlier instruction. For example certain types of instructions may be designated as a condition-setting instruction which may control the instruction decoder to control the processing circuitry to perform a given data processing operation and to also set or update the at least one condition indicator to values which depend on a property of a result of performing that given data processing operation. For example the condition status indicator could indicate whether the result of the data processing operation was negative, whether the result was zero, whether the result of a signed operation caused an overflow, and/or whether a result of an unsigned operation generated a carry or overflow. Such condition status indicators can be useful for enabling operations to be made conditional on comparison functions such as greater than, greater than or equal, equal, not equal, etc.

One issue that may arise if the condition status register is to provide part of the register-provided opcode is that some instruction set architectures may not provide the ability to specify the condition status register as a direct source register of a program instruction. For example, in most instruction set architectures supporting conditional instructions, whether or not the condition status register is to be read in response to an instruction may be specified by the part of the opcode encoded in the instruction encoding itself, which may directly specify whether this type of instruction is a conditional instruction. However, if a register-provided opcode is being used to expand the number of opcode bits available then if some of those opcode bits have to be used for indicating whether the condition status register is to be accessed, then this may detract from part of the advantage of using the register-provided opcode in the first place.

To avoid expending opcode bits on indicating that the condition status register provides a register-provided opcode, one approach can be to exploit the fact that a general purpose register identifier may be allocated to indicate a program counter register which stores a program counter indicating an instruction address representing a current point of program execution. Sometimes it may be valid for instructions to perform a manipulation using the program counter, and so a particular value of a source register identifier may be allocated as a predetermined program-counter-register-indicating value to allow such instructions to use the program counter as a source operand. For a given instruction other than the RPO instruction, when a source register identifier has this predetermined program-counter-register-indicating value then the at least one data operand for the given instruction may include the program counter stored in the program counter register.

However, for the RPO instruction, when the RPO instruction specifies the predetermined program-counter-register-indicating value for the source register identifier, then this may be interpreted as meaning that the at least one source register should include the condition status register, and so the values of the at least one condition indicator should be passed to the circuit logic which selects the data processing operation to be performed based on the register-provided opcode. This approach means that the condition status indicators can be used to represent part of the opcode without needing to allocate a further value of the register identifier merely for identifying that the condition status register should be used as a source register. This can be useful because typically the number of encodings for a register identifier may already have been selected to be a certain power of two, and so providing an additional encoding may require an additional bit for each register specifier in the instruction encoding, which would further reduce the number of opcode bits available. The program counter register is unlikely to be useful for representing a register-provided opcode, because it would not be possible to set the program counter register to an arbitrary value for selecting the data processing operation to be performed by a subsequent RPO instruction (because modifying the program counter value would lead to a branch away from that subsequent instruction). Hence, by reusing the program-counter-register-indicating value to instead indicate that the condition status indicators should be supplied as a data operand, this improves efficiency of instruction set encoding.

The above explanation has described two examples of using either a general purpose register or a condition status register to encode the register-provided opcode. It will be appreciated that some implementations of an RPO instruction could combine these approaches so that both a general purpose register and the condition status register provide respective parts of the opcode of the instruction which is used to select which data processing operation to perform.

The RPO instruction could be an instruction which only specifies one source register identifier (which could be separate from the destination register or be the same register as the destination register as discussed above). However, the use of the RPO instruction approach can be particularly useful for instructions which specify multiple source register identifiers, as with an increasing number of source register identifiers there is less and less space in the instruction encoding for representing opcode bits, and so with some variants it may be desirable for one of those source registers to instead specify part of the opcode.

For the RPO instruction, the register-provided opcode may not be the only part of the opcode. The instruction encoding of the RPO instruction could also specify an immediate value which represents another part of the opcode, so that the selected data processing operation is selected depending on both the immediate value and the register-provided opcode.

Not all instructions supported by the instruction decoder need be treated as RPO instructions. The instruction decoder may also support at least one non-register-provided-opcode (non-RPO) instruction which specifies at least one source register, for which the opcode is represented solely by a portion of the instruction encoding of the non-RPO instruction, and the data in the at least one source register of the instruction is used solely as the at least one data operand and is not used as part of the opcode.

The RPO instruction and the non-RPO instruction may have different encodings for the portion of the instruction encoding which represents the opcode of the non-RPO instruction. Hence, it is possible to identify from the instruction encoding itself whether it is necessary to read one of the source registers of the instruction to identify further opcode bits. In some examples, for at least some encodings of that portion of the instruction encoding which represents the opcode in a non-RPO instruction, a particular bit of that portion of the instruction encoding could signify whether the instructions should be treated as the non-RPO instruction or the RPO instruction. Other approaches may have a more arbitrary mapping of the portion of the instruction encoding which corresponds to the opcode of the non-RPO instruction, with a subset of possible values of that opcode portion being allocated to representing RPO instructions and a remaining subset of the values of the portion representing the opcode for non-RPO instructions.

More particularly, if for each instruction supported by the instruction decoder a certain part of the instruction encoding located in a predetermined portion of the instruction encoding is considered to represent an instruction-encoded opcode, then the non-RPO instructions may be those instructions within a first subset of instructions which have a first subset of values for the instruction-encoded opcode. For a second subset of instructions which have a second subset of values for the instruction-encoded opcode, an immediate value specified in another portion of the instruction encoding from the instruction-encoded opcode may specify a further part of the opcode. The RPO instruction may be one of the second subset of instructions for which the instruction-encoded opcode and the immediate value have one of a predetermined subset of values. The split between RPO instructions and non-RPO instructions within the second subset of instructions can be arbitrary, with some encodings of the instruction-encoded opcode and the immediate value representing RPO instructions and others representing non-RPO instructions, depending on the needs of a particular processor implementation. Nevertheless, by having a certain designated predetermined portion of the instruction encoding which distinguishes whether the instruction can only be a non-RPO instruction (as for the first subset of instructions) or whether it is possible for the instruction to represent an RPO instruction (as in the case of the second subset of instructions), this can make control of a processor pipeline simpler as for the first subset of instructions it may be guaranteed that the registers referenced in the instruction would be used as data operands and so are not needed for selecting the data processing operation to be performed.

The techniques discussed above can be particularly useful for implementing custom instructions which are defined in a given instruction set architecture to permit processor designers to implement certain customised data processing operations which are not prescribed by the instruction set architecture itself. For example, an ISA designer may define a certain set of core instructions which are required to be implemented by a processor supporting a given ISA, which could include certain relatively simple operations such as arithmetic or logical operations, as well as other more complex operations which are nevertheless expected to be frequently used enough that it is worth designating a particular non-RPO instruction encoding for that particular operation. However, in general it will not be possible to support, in the architecturally-mandated instruction definition, every possible processing function which a designer of a particular processor may wish to implement, and so in a typical ISA then any other processing operations may need to be split into multiple instructions.

Nevertheless, for a processor designed for a particular application, there may be a certain type of processing operation which may be frequently performed and so it would be beneficial for a processor designer to be able to choose to implement hardware which can perform that operation in a single instruction, even if not prescribed by the ISA. Hence, a given ISA may provide encoding space for a limited number of custom instructions which may have an encoding which is defined in the given ISA, but for which the corresponding data processing operation is an implementation-specific custom data processing operation not prescribed by the given ISA.

Unlike for the regular architecturally-defined instructions, for custom instructions the normal instruction-encoded opcode of the instruction may not actually be useful for encoding the particular data processing operation to be performed in response to the custom instruction, because it may have to distinguish the fact that the instruction is a custom instruction from all of the other instructions which are architecturally-mandated by the given ISA, and so there may be relatively few extra bits available in the instruction encoding for selecting which particular custom data processing operation is to be performed. For example, while an immediate value may be able to be specified in the instruction, there may only be a relatively small number of bits available for this, especially if the custom instruction is to specify multiple source registers. Hence, for custom instructions, it can be particularly useful to provide an implementation which uses the register data stored in a particular source register of the instruction as additional opcode space to expand the total number of data processing operations which can be supported for a given encoding of a particular custom instruction.

Note that whether a given encoding of a custom instruction is decoded as the register-provided-opcode instruction or as a non-RPO instruction may not be prescribed by the given ISA. The designer of a particular hardware implementation of a processor may select which encodings of the custom instruction are decoded using the register-provided opcode and which are decoded using the opcode represented solely within the instruction encoding itself. The instruction set architecture itself may simply specify that the custom instruction is an instruction with an instruction-encoded opcode having one of a certain subset of values, and may specify formats for specifying register specifiers or the immediate value, but then may leave it up to the designer of a particular hardware system how to use the data from the referenced registers and the immediate value, with the split between bits of data operands and bits of opcodes being arbitrarily chosen depending on how many different data processing operations the hardware implementer wishes to support.

The technique discussed above may be implemented in a hardware processor which has hardware circuit features providing the processing circuitry and the exception control circuitry as discussed above. However, in other examples, the technique may be implemented within a program for controlling a host data processing apparatus to simulate processing of a target program by target processing circuitry. The computer program providing the simulation may be stored on a storage medium. The storage medium may be a transitory storage medium or a non-transitory storage medium.

Such simulation computer programs can be useful for allowing target programs developed according to a target instruction set architecture to be executed on a host data processing apparatus which does not itself support the target instruction set architecture. This can be useful for a number of reasons, such as for allowing legacy code to execute on a newer device which does not support the architecture for which the code was developed, or for testing a target program, which is under development for a new instruction set architecture to be released in future, before any hardware devices supporting that new instruction set architecture are yet available. Whereas a hardware-implemented device may have hardware circuits providing the features discussed above, the software simulation may provide corresponding software features, such as program logic and data structures, which emulate the functionality of the corresponding hardware, so that the target program can execute on the simulation in a similar way to how target program would be executed by a corresponding hardware device.

Hence, the computer program may have register emulating program logic and instruction decoding program logic which simulate the functionality of the registers and the instruction decoder described above. The instruction decoding program logic may support interpreting an instruction within the target program as a register-provided-opcode instruction as discussed above, so that the particular data processing operation performed in response to that instruction is selected based on the first portion of data corresponding to the at least one source register specified in the register-provided-opcode instruction, as emulated by the register emulating program logic using a register emulating data structure. For example the register emulating data structure may be a data structure stored in the memory of the host data processing apparatus.

FIG. 1 schematically illustrates an example of a portion of a data processing apparatus 2 which has a processing pipeline for processing instructions. For example the apparatus 2 could be a CPU (central processing unit) or GPU (graphics processing unit). An instruction decoder 4 receives instructions fetched from an instruction cache or memory and decodes them to generate control signals 6 for controlling other parts of the system to perform corresponding data processing operations. The processing apparatus 2 has registers 8 provided in hardware for storing data values which can be used to represent the data operands of instructions and/or can represent a register-provided opcode identifying part of the opcode of the instruction. An execute unit 10 includes a number of types of processing circuit for carrying out different types of data processing operations as represented by the corresponding instructions decoded by the instruction decoder 4. For example the execute circuitry 10 could include an arithmetic/logic unit (ALU) for performing arithmetic or logical operations on integer operands, a floating-point unit for performing floating-point operations involving numbers represented in a floating-point representation, and a load/store unit for executing load/store instructions to load data from a memory system (not shown in FIG. 1) to the registers 8 or store data from the registers 8 to the memory system. A write back stage 12 writes back results of executed instructions to the registers 8.

Figure 2:
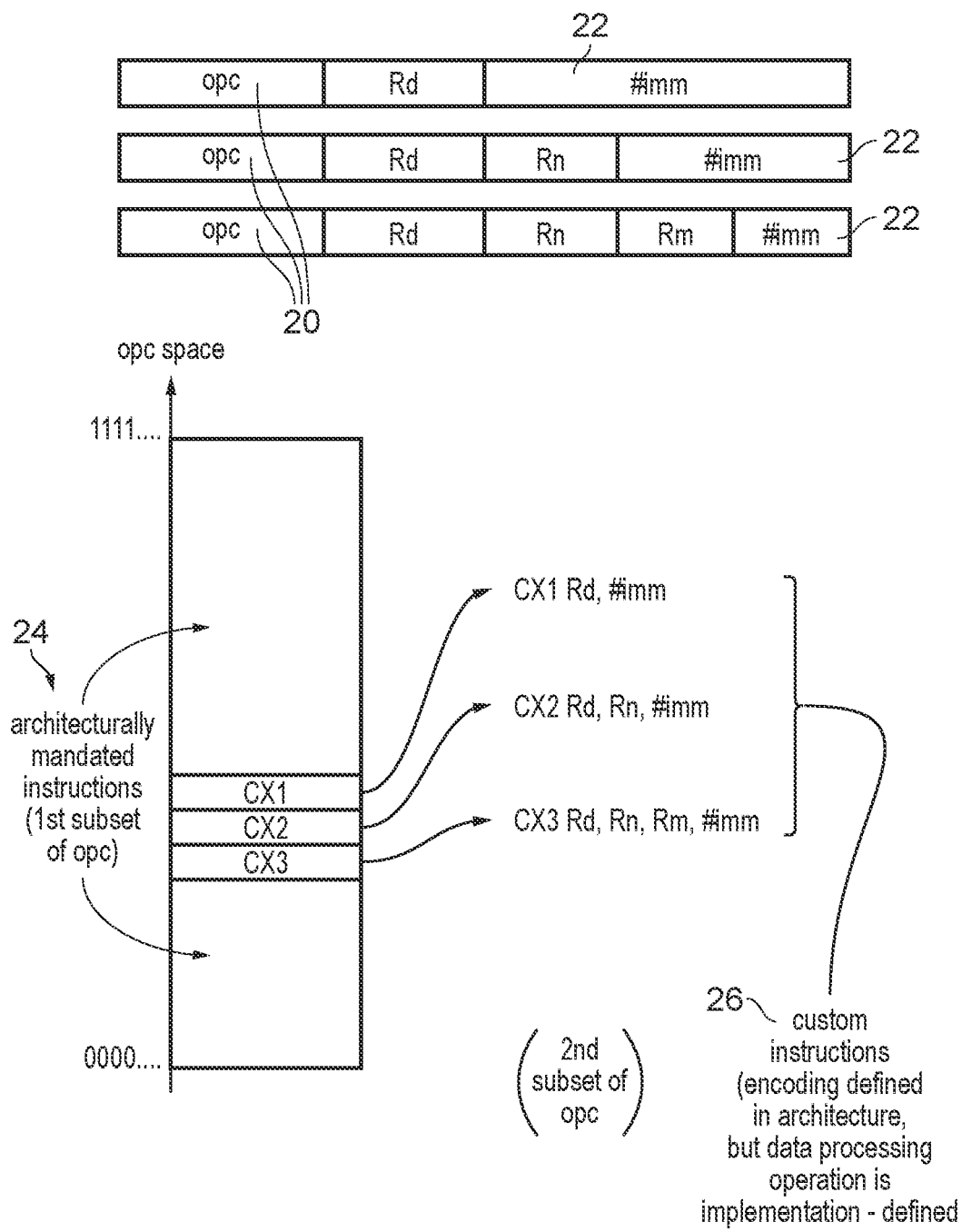
FIG. 2 illustrates an example of custom instructions supported by an instruction set architecture.

As shown in FIG. 2, instructions processed by the processing apparatus may have an encoding which specifies for each instruction an instruction-encoded opcode (opc) 20, and depending on the particular instruction, may also specify an immediate value #imm 22 and/or one or more register identifiers identifying a destination register Rd, and optionally one or more further source registers Rn, Rm. For some instructions the destination register Rd may itself act as a further source register as well as being the destination register, so that the previous value stored in that register is used as a source operand and then the result of the instruction is written back to the destination register overwriting that source operand. As shown in FIG. 2, different types of instructions may specify different numbers of registers and so may have different numbers of bits available for encoding any immediate value 22.

Figure 4:
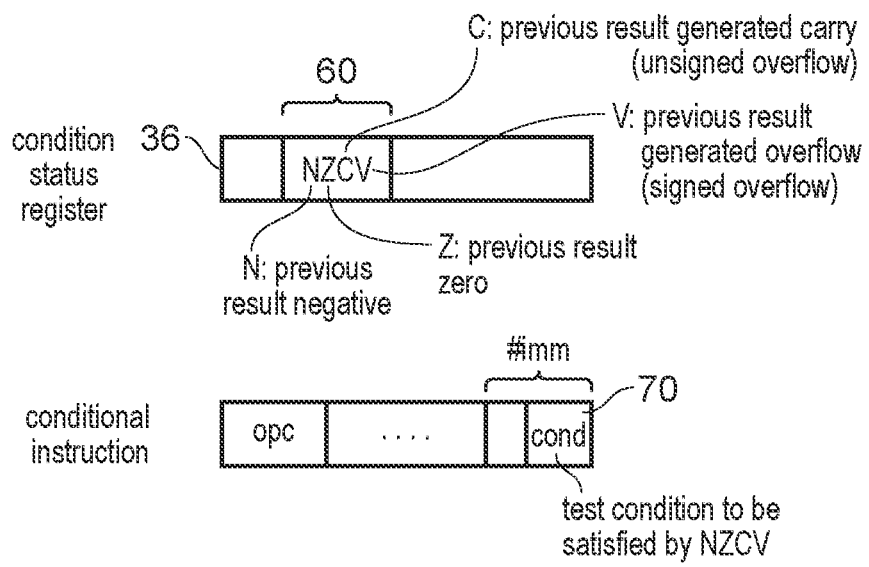
FIG. 4 illustrates a condition status register which can be used by a conditional instruction to control a conditional operation depending on whether a test condition is satisfied by condition flags stored in the condition status register.

As shown in FIG. 1, the registers 8 may include a number of types of registers including general purpose registers in an integer register file 30 for storing integer values, general purpose registers in a floating-point register file 32 for storing floating-point values, as well as certain system registers which have architecturally defined functions for controlling system operation, such as a program counter (PC) register 34 which indicates a current point of instruction execution and a condition status register 36 which is described below with reference to FIG. 4. The destination and source register specifiers shown in the instructions in FIG. 2 may generally select registers from one of the general purpose register files 30, 32. In some implementations the program counter register 34 may be treated as one of the general purpose registers which has a particular register number. Which of the register files 30, 32 is to be accessed in response to a given instruction may be identified from the instruction-encoded opcode 20, so that an instruction with one value for the instruction-encoded opcode may select registers from the integer register file 30 while another instruction with a different value of the opcode may select registers from the floating-point registers file 32 (even if the register specifiers are the same as those used to select from the integer register file for the first instruction).

As shown in FIG. 2, the possible encodings of the instruction-encoded opcode field 20 can have one of a range of values extending from a value in which all the bits of opc are equal to 0 and to a value where all of the bits of the opc field 20 are all 1. A first subset of the possible values for the opc field may represent architecturally-mandated instructions 24, for which both the encoding format and the data processing operation to perform for that instruction are prescribed by the instruction set architecture supported by the processing apparatus 2. For the architecturally-mandated instructions, the opcode may either be solely represented by the opc field 20 within the instruction encoding, or could be represented by the combination of the opc field 20 and the immediate field 22. The registers specified in the instruction encoding can be used to provide data operands which are to be processed in the data processing operation represented by the instruction.

On the other hand, for a second subset of possible values of the opc field 20, these instructions can represent custom instructions 26 for which while the ISA defines how the instructions should be encoded, the particular data processing operation represented by the instruction may be implementation-defined. That is, the designer of a particular processing system to be implemented in hardware is freed to select what particular data processing operation is represented by that instruction. Software written for that particular processor implementation may therefore use the custom instruction encoding to control particular operations which are not defined in the instruction set architecture, so that they can be performed in a single instruction, which might otherwise need a combination of multiple instructions. This can allow certain common operations required for a particular implementation to be carried out more efficiently. For example, if there is a system which uses particular fixed-point or floating-point number formats, then certain custom instruction encodings may be allocated to represent conversions to or from those special number formats, which could allow conversion operations to be done more efficiently than using a sequence of arithmetic, logical or shift instructions to perform an equivalent operation. Another example for which a custom instruction could be useful is if a register has a number of bits which each correspond to a given external device and provide a bit indicating a certain status of the device (such as whether the device is enabled or disabled, or whether the device has asserted a message), and a population count function needs to be evaluated to determine how many devices are enabled or have asserted messages. Without a dedicated "population count" instruction this may require a number of shift and logical instructions to manipulate the bits of the register so as to generate a numeric count of the number of asserted bits, whereas some processing logic in hardware could do this more efficiently in response to an individual instruction if one of the custom encodings is allocated to represent this operation. These are just some possible examples, and the custom operation is not limited to these.

As shown in FIG. 2, a number of different types of custom instructions could be defined, for example three custom instructions having different values for the opc field 20 are provided specifying different numbers of source registers. A first custom instruction CX1 specifies a single register specifier Rd which identifies the destination register which could also optionally be used as a source register, and then remaining bits are used as an immediate field. Further custom instructions CX2 and CX3 define additional source registers Rn or Rm, which reduces the number of bits available for the immediate field 22. It will be appreciated that this is just a subset of the examples of custom instructions which could be provided. Further variants could provide an accumulation function where, in addition to calculating a result value, the result value is then added to the previous contents of the destination register to generate the result, rather than simply overwriting the value in the destination register. Also, some custom instructions could be interpreted such that a source register reference to a particular register results in not only that particular register's contents being returned as a source operand for the instruction, but also returns the value stored in the next adjacent register, so that registers are effectively referenced in odd/even pairs, which can increase the width of the operands for a custom instruction.

While FIG. 2 shows an example where the three custom instructions CX1-CX3 are shown as having opc values in adjacent parts of the opc space, this is not essential and it is possible for the custom instructions to be allocated any arbitrary encoding of the instruction-encoded opcode field 20.

For each of the custom instructions, the immediate field 22 could be used as a further part of the opcode to distinguish which particular data processing operation is to be performed. For example the immediate field could specify that the operation for a given instruction should be the population count function discussed above, or should be a particular type of data format conversion. Hence, the CX1 instruction shown in FIG. 2 corresponds to a single encoding of the opc field 20 within the instruction set architecture, to distinguish this instruction from the other architecturally-mandated instructions 24, but may control the processor to perform any of two or more different processing operations depending on the value of the immediate field 22.

Returning to FIG. 1, the example of the processing system 2 shown in FIG. 1 separates the portions of the instruction decoder 4 and the execution circuitry 10 for decoding and executing instructions into a first portion 40 and a second portion 42 for handling the architecturally-mandated instructions and the custom instructions respectively. For the architecturally-mandated instructions 24, when the instruction decoder 4 detects that the opc field 20 represents one of these architecturally-mandated instructions, then the instruction is passed to the regular execute circuitry 10 for execution using values in the registers 8. In contrast, when the decoded instruction is one of the custom instructions then its instruction-encoded opcode field (opc) 20, its immediate value #imm 22 and any register values 44 required by the instruction are passed via an auxiliary execution interface 46 to an auxiliary decoder 48 which provides a further part of the instruction decoder 4 for providing the additional implementation-specific instruction decoding functions required to distinguish which particular data processing operation to perform in response to the custom instruction. The auxiliary execution interface 46 is provided within the first portion 40 of the apparatus and provides the signal paths for outputting the instruction-encoded opcode 20, immediate value 22 and register values 44 and for returning a result value from the second portion 42 to the write back stage 12 to write back to the registers 8.

The second portion 42 of the apparatus includes the auxiliary decoder 48 and also includes auxiliary execution circuitry 50 which comprises the hardware for performing the custom data processing operations supported for the custom instructions, with the auxiliary decoder 48 selecting which particular custom data processing operation the auxiliary execution circuitry 50 should perform based on the opcode of the custom instruction. The auxiliary execution circuitry 50 generates a result value which is then passed back via the auxiliary execution interface 46 to the write back stage 12 to write back to the destination register of the instruction.

Hence, by separating the hardware logic for decoding and executing the custom instructions into a separate part of the integrated circuit from the part providing the architecturally mandated instructions, this can simplify system development for an implementer of a data processing system which supports custom instructions, as the circuit logic within the first portion 40 could have a standard design supplied by a microprocessor designer which designs the components and the circuit timings of the first portion so as to be suitable for all processors supporting the architecturally-mandated functions of the instruction set architecture. The standard design could define an auxiliary execution interface 46 for inputting and outputting values exchanged with a further portion of the integrated circuit which can be designed to have the specific custom functionality, so that the designer of the overall system only needs to focus on the second portion 42 for implementing their custom functions and can reuse an off-the-shelf design for the first portion 40.

Figure 3:
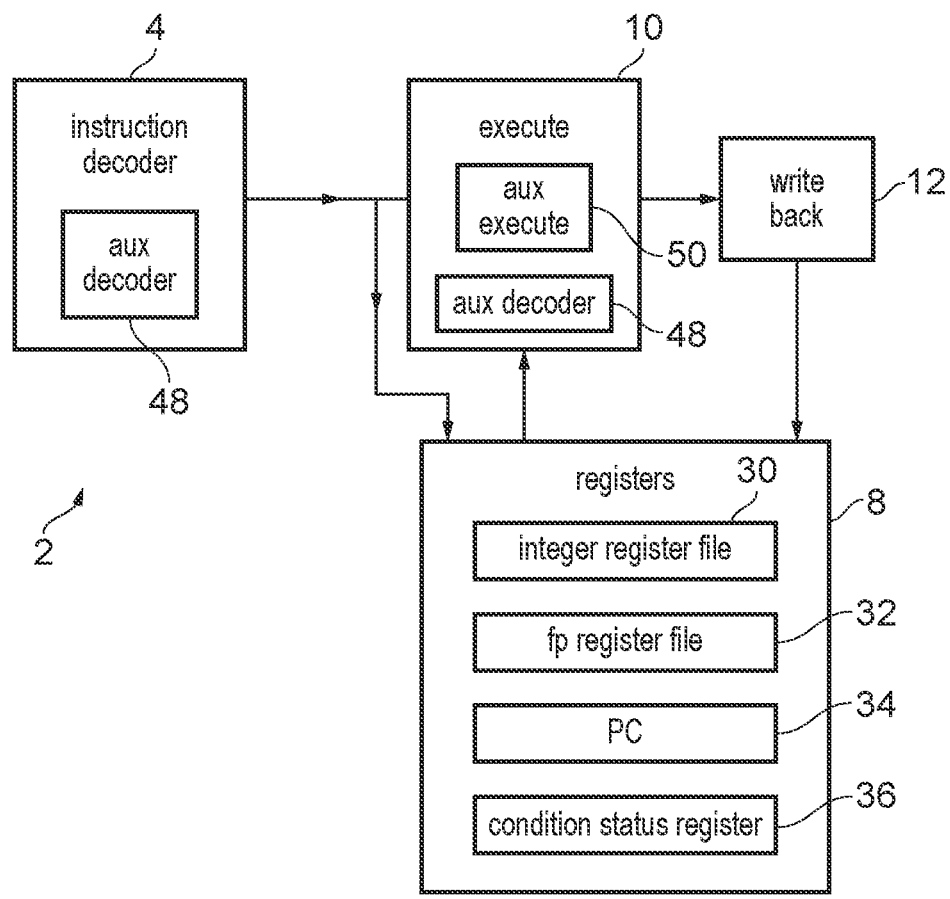
FIG. 3 shows an alternative example of a data processing apparatus supporting the custom instructions.

As shown in FIG. 3, an alternative approach to supporting the custom instructions could be to provide an apparatus 2 where the auxiliary decoder 48 and the auxiliary execution circuitry 50 are built into the instruction decoder 4 and execute stage 10 for handling the architecturally-mandated functions, so that there is no hard partitioning between the architecturally-mandated and custom functions. Hence, the auxiliary execution circuitry 50 could appear similar to the other execute units such as an ALU, floating-point unit or load/store unit within the execute stage 10, providing another functional unit which can be selected in response to instructions, and there is no need to provide a dedicated auxiliary execution interface 46 for use in custom instructions. The auxiliary instruction decoder 48 could be incorporated into the instruction decoder for itself so that a common set of logic decodes both the regular architecturally-mandated instructions and the custom instructions. This approach can be more efficient in terms of performance as it may allow reduced circuit area and improve timings relative to the case where the instructions of the custom instruction encodings are passed to a separate portion of circuit logic as in FIG. 1. However, the FIG. 3 approach may require more development work for the manufacturer of the custom implementation because this approach may not support reuse of an off-the-shelf first portion 40 of logic as in FIG. 1, but may require the whole processor design to be designed with appropriate components and circuit timings to implement both the core architectural functionality and the custom functions desired for that particular processor implementation.

FIG. 4 shows the condition status register 36 in more detail. The condition status register 36 may store a number of pieces of information regarding the status of the processor, including types of information not directly discussed in this application. However, one piece of condition status information may be a number of condition status flags 60 which indicate properties of a result of a previous condition-setting instruction executed by the processor. As shown in the example of FIG. 4, the condition status flag 60 may include four flags, including a negative flag N indicating whether the result of the condition-setting instruction was negative, a zero flag Z indicating whether the result of the condition-setting instruction was zero, a carry flag C indicating whether the result of the condition-setting instruction generated an overflow in an unsigned processing operation (i.e. generated a carry out from a most significant bit of the result) and/or an overflow flag V which indicated whether a result of the condition-setting instruction generated a signed overflow (i.e. a carry out from the second most significant bit). Whether a particular instruction is a condition setting instruction or not can be dependent on the instruction-encoded opcode field 20 of the instruction, or further opcode information such as specified in the immediate field 22. Whether the instruction is condition-setting could also depend on the register-provided opcode discussed below.

Some types of instructions may be treated as conditional instructions (whether an instruction is conditional or not depends on the opcode). For a conditional instruction, the instruction specifies a test condition 70 as shown in FIG. 4. The test condition specifies a certain condition to be satisfied by the condition flags 60 in the condition status register 36, in order for the corresponding data processing operation to be performed. For example a conditional add instruction may perform an add operation if the condition is satisfied but may leave the destination register unchanged if the condition is not satisfied. Different condition values in the condition field 70 may specify different conditions, such as requiring that the operation is performed if the previous result was negative, or not negative, etc. Different conditions may be defined for different combinations of status of the respective condition flags.

FIG. 5 shows different ways in which the opcode and the data operands of an instruction can be represented. The opcode is the part of the instruction which selects which particular data processing operation to perform in response to the instruction. The data operands are the values which are processed in that particular data processing instruction. FIG. 5 is a table showing which values are used to identify the opcode and the data operands for architecturally-mandated instructions, custom instructions which are interpreted as non-register-provided-opcode instructions (non-RPO instructions) and custom instructions which are interpreted as register-provided-opcode instructions (RPO instructions).

For the architecturally-mandated instructions, the opcode is indicated by the instruction-encoded opcode (opc) 20 and optionally by the immediate value 22 (or part of the immediate value). The data operands are indicated by the source registers of the instruction, which could include the destination register Rd and/or one or more of additional source registers Rn, Rm, depending on the number of registers encoded in the instruction. The data operands could also be represented optionally by at least part of the immediate value, if not used for the opcode. Also for conditional instructions the data operands may include the condition status flags (NZCV) 60 in the condition status register 36. Hence, for an architecturally-mandated instruction in this example, the opcode is identified completely from bits within the instruction encoding, and does not require reading of a register.

For the custom instructions which are interpreted as a non-RPO instruction, the opcode and data operands can be represented in exactly the same way as the architecturally-mandated instruction, except that at least part of the immediate value 22 is used to represent the opcode, as the instruction-encoded opcode opc 20 is used to distinguish the fact that this instruction is a custom instruction instead of an architecturally-mandated instruction. The various registers Rd, Rn, Rm and the condition status flags 60 are used solely to identify data operands for the operation, and so the selection of the particular data processing operation to perform depends solely on the parts of the opcode opc, #imm which are directly encoded within the instruction encoding.

In contrast, for the custom instructions which are interpreted as an RPO instruction, in addition to the instruction-encoded parts of the opcode, which may include the opc field 20 and all or part of the immediate field 22, the opcode also includes a part represented by a first portion of register data stored in one or more of the source registers or the condition status flags 60. The data operands are represented by a second portion of the register data stored in these registers and/or remaining part of the condition flags. Also it is possible that part of the immediate field 22 could also be used as a data operand.

The particular split between which registers and which parts of the data in those registers are used for the opcode and which are used for data operands may be selected arbitrarily by the designer of a particular data processor implementation. In the example shown in FIG. 1 the auxiliary execution interface 46 may simply pass across the values of the opc, immediate and register values and these may be used by the auxiliary decoder 48 to decide which processing operation the auxiliary execution circuitry 50 should perform. In the example of FIG. 3, as the particular data processing operation to perform may not be known until a source value has been read from a register, then the execute stage 10 may have some auxiliary decoding circuitry 48 to decode the value in the register to distinguish between the different data processing operations to perform.

Some particular examples of RPO instructions are described below. However, in general by using some of the register data to provide additional opcode bits this increases the number of different data processing operations which can be supported for the custom instructions, which is particularly useful given the limited number of bits available in the immediate field 22 for a custom instruction when the opc field 20 is already fully used to distinguish the custom instruction from the architecturally-mandated instructions. This technique of using the RPO instructions is particularly useful for the CX3 variant of the custom instruction shown in FIG. 2 where there are three different register specifiers used and so the number of immediate bits 22 remaining is very low.

Figure 6:
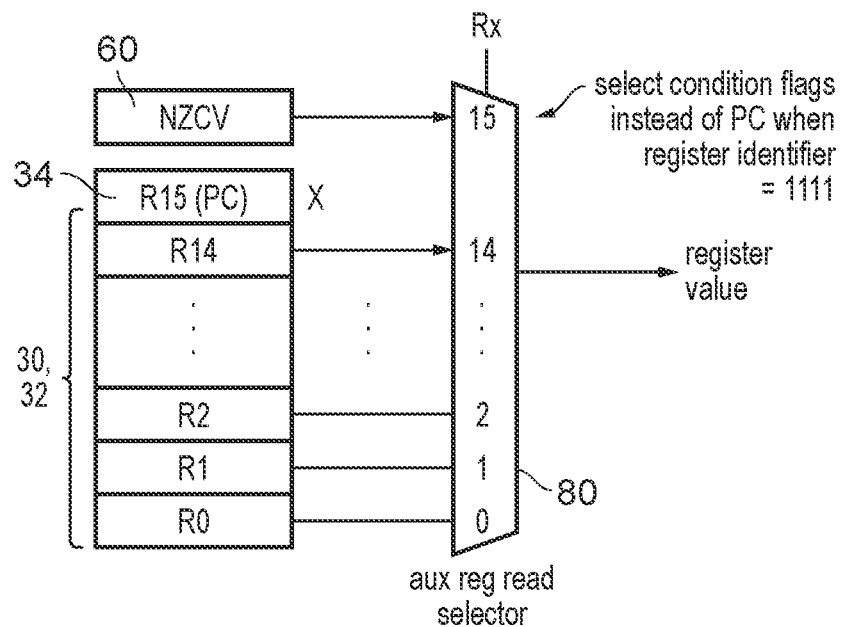
FIG. 6 illustrates how the condition flags may be passed as an operand or opcode to an instruction when a register specifier of the instruction specifies a register identifier corresponding to a program counter register.

FIG. 6 shows a technique which can be used to control the passing of the condition flags 60 from the condition status register 36 to the auxiliary instruction decoding logic 48 so that they can be used to select the data processing operation to be performed for a custom instruction. The register specifiers Rd, Rn, Rm shown in the example of FIG. 2 may be selected from a set of register specifier values which may correspond to a certain number of general purpose registers within the integer register file 30, the floating-point register file 32 or some other general purpose register file. In the example of FIG. 6, the register file 30, 32 is shown as including 16 registers, including the program counter register 34 which may be identified using a particular pc-indicating value of the register specifier, in this example register specifier 15. Hence, in this example the register specifier field could be a 4-bit register specifier identifying one of the 16 registers from register 0 to register 15, where register 15 indicates the program counter register 34. It will be appreciated that other examples could have a different number of registers and hence a different number of register specifier bits.

However, in general, the number of registers in the register file may be a power of 2 and so all of the register identifiers may be allocated to particular general purpose registers. Therefore, one might expect that to be able to indicate that the condition flag 60 should be passed across to the auxiliary decoder 48, this would require a further register specifier to be allocated and hence an additional bit in each register specifier field, but this would reduce the efficiency of encoding of the custom instructions as it would further reduce the number of immediate bits available for a given instruction length.

As shown in FIG. 6, it is recognised that for RPO instructions, it will generally not be practical to use the program counter register 34 to provide the register-provided opcode represented by the first portion of register data for the RPO instruction. This is because the program counter register is typically used to control the flow of program execution, so that if the value in the program counter register is changed then this will redirect program flow to a different instruction from the instruction which would follow sequentially from the previous instruction. This means that it will generally not be possible to include an instruction just before an RPO instruction which sets the program counter register 34 to an arbitrary value to be used as part of the opcode for selecting the data processing operation, as this may disrupt the intended program flow. Therefore, within the selection logic 80 which is used for custom instructions to select which register is read to provide the source values for the instruction, the program-counter-indicating register specifier (15 in the example of FIG. 6) may not signify the program counter register 34, but is instead used to select the condition status flags 60 from the condition status register 36, so that the condition flags can be passed as an input to a custom instruction and potentially be used as the register-provided opcode if the custom instruction is an RPO instruction using those condition flags as opcode bits rather than as condition flags.

Figure 7:
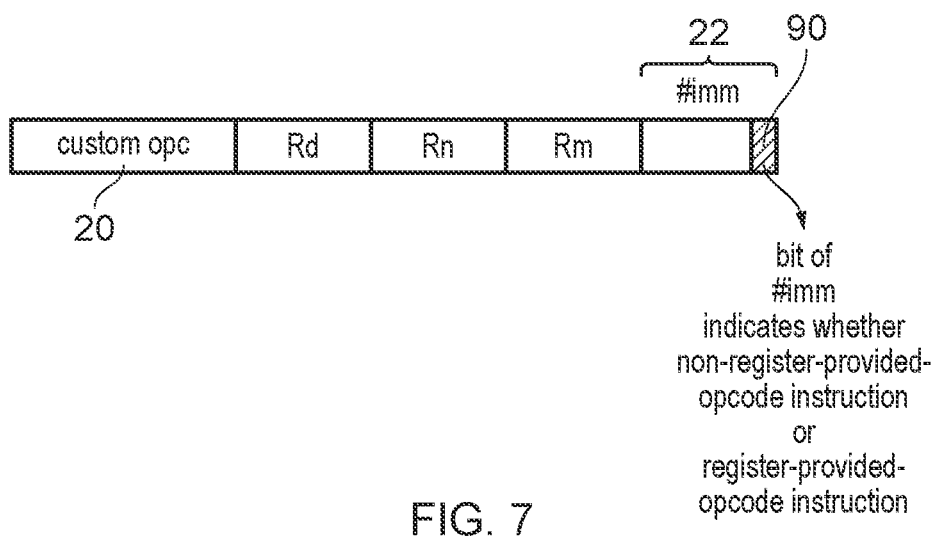
FIG. 7 shows an example where the instruction coding indicates whether the instruction is a non-register-provided-opcode instruction or a register-provided-opcode instruction.

As shown in FIG. 7, for a custom instruction where the opc field 20 has one of the second subset of values indicating that this is a custom instruction, one approach to distinguishing the non-RPO instructions and the RPO instructions is to use a predetermined bit 90 of the immediate field 22 to indicate whether the instruction is a non-RPO instruction or an RPO instruction.

Alternatively, other approaches may not have a dedicated bit indicating whether part of the opcode is stored in a register, but could instead simply use the combined values of the custom opc field 20 and the immediate field 22 to determine whether a particular custom instruction should be treated as a non-RPO instruction or an RPO instruction. Hence, even among instructions which have the same value for the custom opc field 20 (among the encodings which do correspond to custom instructions), instructions having different values for the immediate field 22 could have some instructions treated as non-RPO instructions where the opcode is determined solely based on bits of the instruction encoding, and other instructions treated as an RPO instruction where at least one of the source registers or the condition flags 60 provide further opcode bits.

Figure 8:
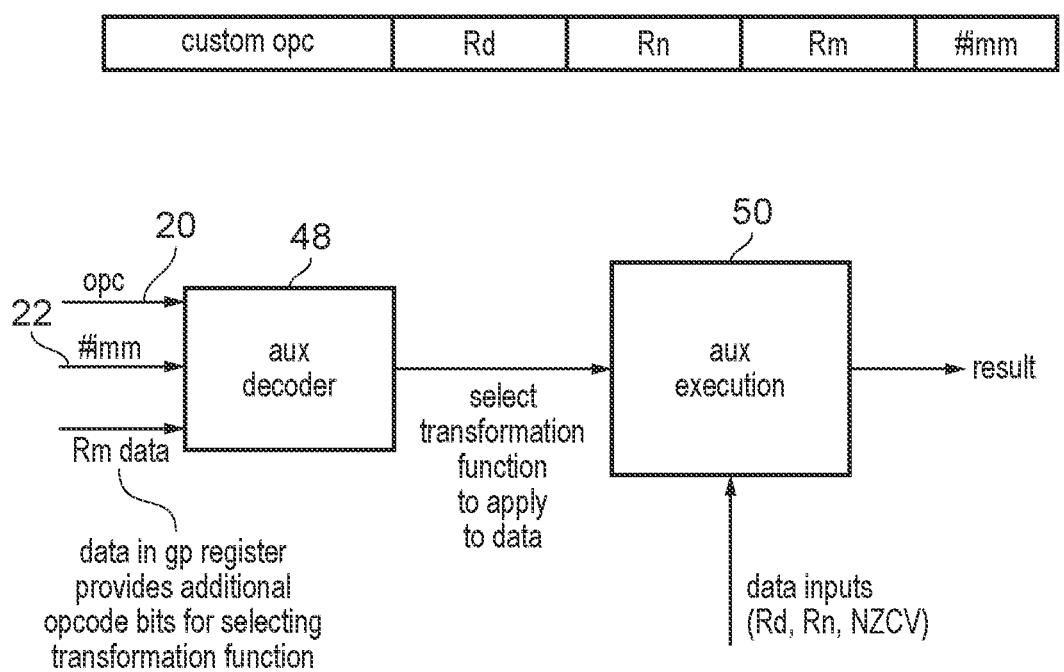
FIG. 8 shows an example where data in a general purpose register specified by a register-provided-opcode instruction can be used to provide additional opcode bits for selecting which transformation function to apply to one or more data operands of the instruction.

FIG. 8 shows an example of an RPO instruction, for which the data value in the Rm source register is treated as a register-provided opcode. The Rm register is a general purpose register selected from either the integer register file 30, the floating-point register file 32 or another register file, rather than being a system register. Hence, the data in the general purpose register referenced using the Rm register specifier provides additional opcode bits for selecting which particular transformation function should be applied to the data operands provided by remaining source registers by the auxiliary execution circuitry 50 to generate the result value. For example the different transformation functions which could be selected based on bits from the data in register Rm could involve different arithmetic, logical, shift or data conversion operations or any combination or sequence of these operations. The different transformation functions selectable for different values of the data in register Rn for identical instruction encodings of the instruction may include different transformations which can each be capable of generating a different numeric value or different data format for the result compared to the data inputs. Hence, by providing the ability to select between different processing transformation functions using the register value, then this means that there is a greater range of options available for a custom implementer than can be encoded within the encoding space available in the instruction encoding itself. Note that the ability to use a register to provide opcode bits can be particularly useful in custom implementations, when for a given set of the opc and the immediate fields 20, 22 only some of those encodings require additional opcode space while other encodings need to use all of the register specifiers to specify data operands. Whereas approaches which always use the register data to provide data operands would therefore constrain either the number of supported data processing operation types or require additional immediate bits, with the ability to use register data as opcode bits then this increases the flexibility to trade off, on an instruction-by-instruction basis, the number of instruction variants against the number of register operands needed.

Figure 9:
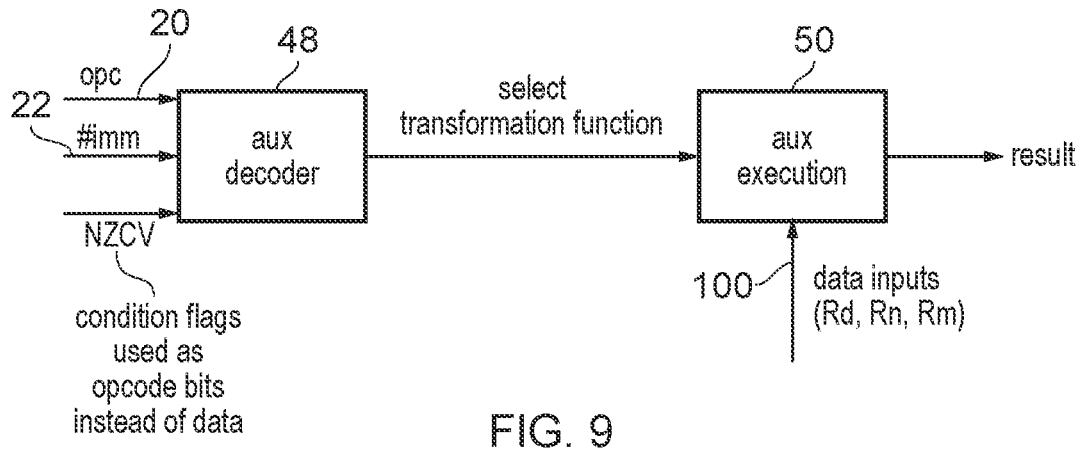
FIG. 9 shows an example of a register-provided-opcode instruction where the condition flags stored in the condition status register are used as part of the opcode.

FIG. 9 shows another example of an RPO instruction, in which the condition flags are used to provide opcode bits. This may be achieved using the approach shown in FIG. 6 so that the RPO instruction may specify as one of its source register specifiers the program counter indicating value, which may cause the condition flags to be passed to the auxiliary decoder 48. The auxiliary decoder 48 uses the condition flags, in combination with the opc and immediate fields 20, 22, to select the transformation function to be applied to the data operands 100 by the auxiliary execution circuitry 50 to generate the result.

While FIGS. 8 and 9 show using either the register data or the condition flags as opcode bits, other approaches could combine these and use both as opcode bits. Also it is not essential for all of the bits within the source register Rm or all of the condition flags to be used as opcode bits and any remaining bits not used to provide the opcode could be used as data operands. Also, some approaches may use multiple registers to provide different portions of the opcode.

Figure 10:
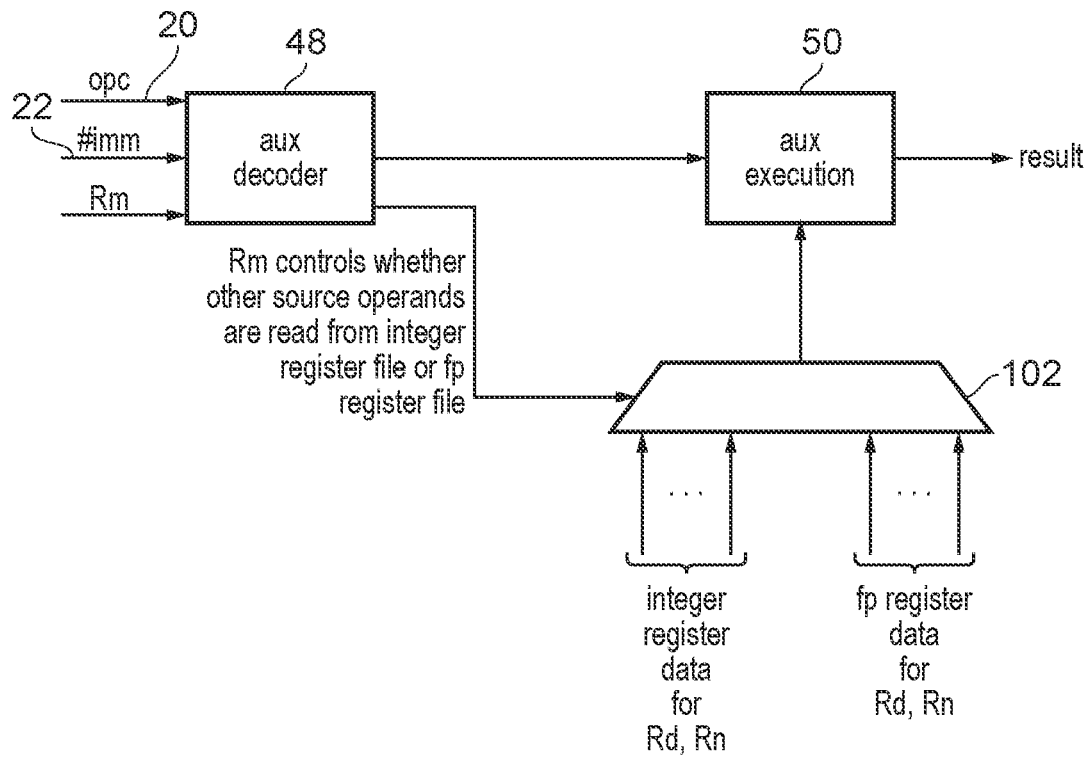
FIG. 10 shows an example of a register-provided-opcode instruction where data in a source register is used to select whether one or more other source registers are accessed from an integer register file or a floating-point register file.

As shown in FIG. 10, for another variant of RPO instruction, the register-provided opcode could, instead of selecting which transformation function should be applied by the auxiliary execution circuitry, select which register file other source operands are read from (e.g. selecting between the integer register file 30 and the floating point register file 32). In the approach in FIG. 1, the registers from both register files 30, 32 could be read out for each custom instruction and supplied by the auxiliary execution interface 46, in case they are selected by the auxiliary decoder 48 based on the register-provided opcode. Alternatively, the source register which provides the register-provided opcode could be read out first and then the remaining registers to be used as data operands may be read out in a subsequent cycle once selector logic 102 has selected the appropriate register file 30, 32 to read. Again, the approach shown in FIG. 10 could be combined with those in FIGS. 8 and 9 so that is also possible to select both the register file to be used for source inputs and the transformation function to be applied, based on the register-provided opcode.

It will be appreciated that the examples discussed above are just some examples of how a value in a general purpose or condition code register could be used to select which data processing operation to apply.

Figure 11:
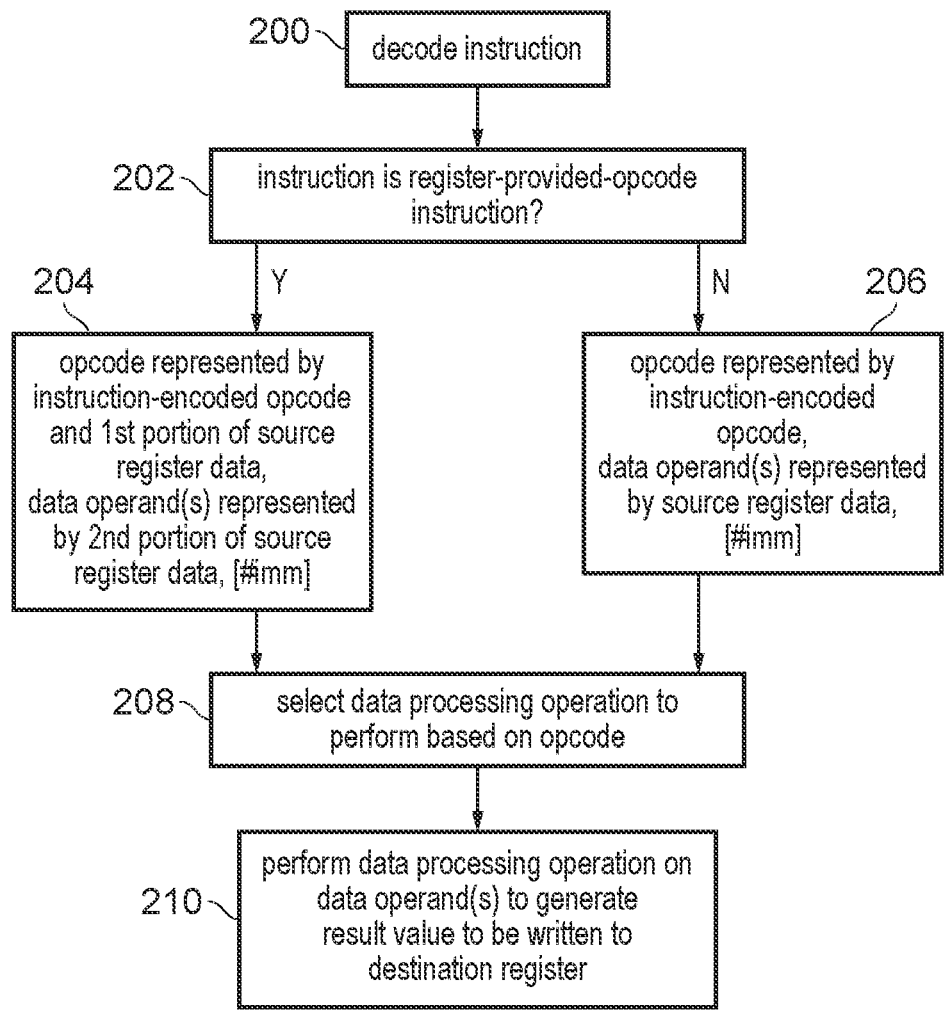
FIG. 11 is a flow diagram showing a method of data processing.

FIG. 11 is a flow diagram illustrating a method of processing instructions in a data processing apparatus 2. At step 200 the instruction decoder 4 decodes the instruction. At step 202 the instruction decoder 4 determines, based on the instruction encoding of the instruction (e.g. based on the opc and immediate fields 20, 22) whether the instruction is a register-provided-opcode instruction. If so, then at step 204 the instruction decoder 4, 48 determines that the opcode of the instruction is represented by an instruction-encoded opcode directly specified by the instruction encoding of the instruction. The instruction-encoded opcode may include the opc field 20 and at least part of the immediate value 22. Also, part of the opcode is represented by a first portion of source register data stored in at least one source register specified by the instruction. The data operand(s) for the instruction are represented by a second portion of source register data for the instruction, and also optionally by part of the immediate field if this is not used to represent the opcode.

On the other hand, if the instruction is not a register-provided-opcode instruction then at step 206 the opcode is determined to be represented by the instruction-encoded opcode 20, 22, and in this case the data operands for the instruction are represented by the source register data in any source registers of the instruction (including optionally the condition status flag 60), and also in some cases the immediate value could at least partly be used to represent the data operand. For non-RPO instructions, in some cases the immediate value 22 may not be used to represent the opcode at all, and could solely represent data operands, while in other cases the immediate value 22 could at least partly be used to represent the opcode.

Regardless of whether the instruction is an RPO instruction or not, at step 208 the instruction decoder 4, 48 selects which data processing operation should be performed based on the opcode identified at one of steps 204, 206. Different data processing operations may vary in terms of the particular set of arithmetic, logical, shift or conversion functions performed, or in terms of which register file to obtain the source operands from. At step 210 the execute circuitry 10, 50 is controlled to perform the data processing operation selected at step 208 on the data operands identified at step 204 or 206, to generate a result value which can be written back to a destination register 12. In some cases, the register file including the destination register may also be selected based on the opcode.

Figure 12:
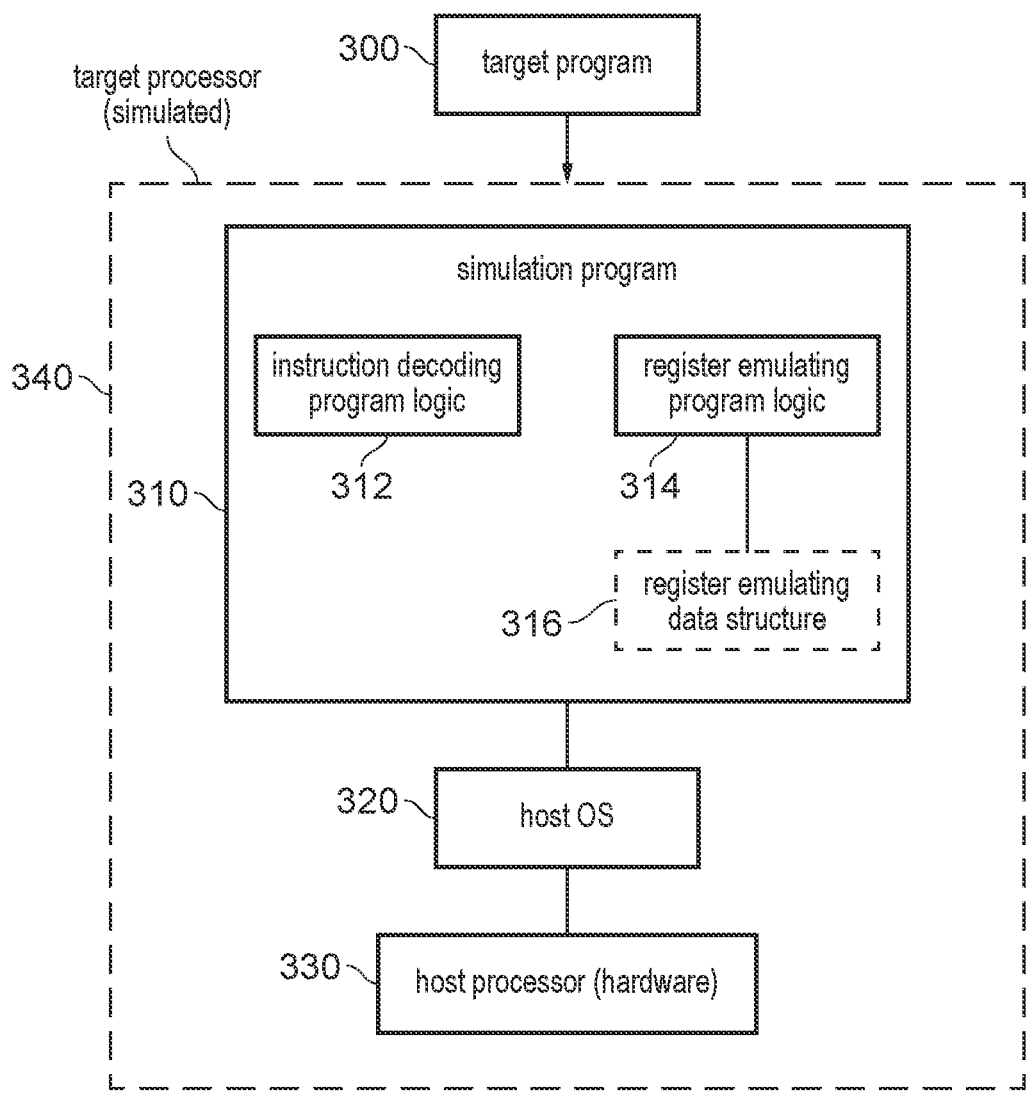
FIG. 12 shows a simulator example that may be used.

FIG. 12 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 330, optionally running a host operating system 320, supporting the simulator program 310. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 330), some simulated embodiments may make use of the host hardware, where suitable.

The simulator program 310 may be stored on a computer-readable storage medium (which may be a non-transitory medium), and provides a program interface (instruction execution environment) to the target code 300 (which may include applications, operating systems and a hypervisor) which is the same as the application program interface of the hardware architecture being modelled by the simulator program 310. Thus, the program instructions of the target code 300, including RPO instructions as described above, may be executed from within the instruction execution environment using the simulator program 310, so that a host computer 330 which does not actually have the hardware features of the apparatus 2 discussed above can simulate the behaviour of a target processor 340 which does have these features.

For example, the simulation program 310 may include instruction decoding program logic 312 which provides equivalent functionality to the instruction decoder 4, 48 of the hardware embodiment 2 described above. The instruction decoding program logic 312 decodes instructions of the target program 300, and maps them to corresponding sets of instructions in the native instruction set supported by the host processor 330 which control the host processor 330 to perform the required functions. The simulation program 310 includes register emulating program logic 314 which maintains a register emulating data structure 316 in the memory of the host processor 330 which tracks the register state which would be stored in the registers 8 if the target program 300 was executed on the hardware apparatus 2 described above. Hence, when an RPO instruction is included in the target program 300, the instruction decoding program logic 312 decodes the RPO instruction and the register emulating program logic 314 controls the host processor 330 to read the register-provided opcode from a storage location within the register emulating data structure 316, and the instruction decoding program logic 312 uses the register-provided opcode and the instruction-encoded part of the opcode to determine what processing operations should be performed by the host processor 330 to emulate the functionality of the RPO instruction.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
a plurality of registers to store data;
processing circuitry to perform data processing using data obtained from the registers; and
an instruction decoder to decode an instruction specifying an opcode and at least one data operand, to control the processing circuitry to perform a data processing operation identified by the opcode on the at least one data operand, to generate a result value to be written to a destination register;
in which for a register-provided-opcode instruction specifying at least one source register:
at least part of the opcode is a register-provided opcode represented by a first portion of data stored in said at least one source register of the register-provided-opcode instruction;
the at least one data operand comprises data represented by a second portion of the data stored in the at least one source register;
in response to the register-provided-opcode instruction, the instruction decoder is configured to control the processing circuitry to select, based on at least the register-provided opcode, one of a plurality of different data processing operations supported for the same instruction encoding of the register-provided-opcode instruction; and
said plurality of different data processing operations include at least two different data processing operations which are each capable, for at least a subset of possible input values for said at least one data operand, of generating the result value with a different value or a different data format to said at least one data operand.

2. The apparatus according to claim 1, in which the at least two different data processing operations comprise at least two different transformation functions for generating the result value from the at least one data operand.

3. The apparatus according to claim 2, in which each of said at least two different transformation functions comprises a different subset or combination of one or more of:
at least one arithmetic operator;
at least one logical operator;
at least one shift operator; and
at least one data format conversion operator.

4. The apparatus according to claim 1, in which the registers comprise at least two register files; and
the at least two different data processing operations comprise operations which use different register files to provide at least one source register for storing the at least one data operand or the destination register for storing the result value.

5. The apparatus according to claim 1, wherein the register-provided opcode is represented by data stored in at least part of a general purpose register specified as one of said at least one source register.

6. The apparatus according to claim 5, in which the register-provided-opcode instruction specifies a plurality of source registers,
the at least one data operand is represented by data stored in one or more of said source registers other than said general purpose register used to provide the register-provided opcode, and
the at least one data operand is independent of data in said general purpose register used to provide the register-provided opcode.

7. The apparatus according to claim 1, in which the registers comprise a condition status register to store at least one condition indicator;
in response to a conditional instruction, the instruction decoder is configured to control the processing circuitry to perform a conditional operation which is conditional on whether the at least one condition indicator satisfies a test condition specified by the conditional instruction; and
the register-provided opcode is represented by at least part of the at least one condition indicator stored in the condition status register.

8. The apparatus according to claim 7, in which the condition status register is configured to store a plurality of condition indicators, and the register-provided opcode is represented by all of said plurality of condition indicators.

9. The apparatus according to claim 7, in which the condition status register is configured to store a plurality of condition indicators; and
the register-provided opcode is represented by a first subset of said plurality of condition indicators.

10. The apparatus according to claim 9, in which the register-provided-opcode instruction is a conditional register-provided-opcode instruction for which, for at least one of the plurality of different data processing operations, the data processing operation is conditional on whether a remaining subset of said plurality of condition indicators satisfy a test condition specified by the conditional register-provided-opcode instruction.

11. The apparatus according to claim 7, in which in response to a condition-setting instruction, the instruction decoder is configured to control the processing circuitry to perform the data processing operation represented by the opcode of the condition-setting instruction and to update the at least one condition indicator stored in the condition status register based on a property of a result of performing that data processing operation.

12. The apparatus according to claim 7, comprising a program counter register to store a program counter indicative of an instruction address representing a current point of program execution;
for a given instruction other than said register-provided-opcode instruction, when a source register identifier specified by the given instruction has a predetermined program-counter-register-indicating value, the at least one data operand for the given instruction includes the program counter stored in the program counter register; and
when the register-provided-opcode instruction specifies a source register identifier having said predetermined program-counter-register-indicating value, said at least one source register includes the condition status register.

13. The apparatus according to claim 1, in which the register-provided-opcode instruction specifies a plurality of source register identifiers indicating a plurality of source registers, and the register-provided opcode is stored in at least one of the plurality of source registers.

14. The apparatus according to claim 1, in which an instruction encoding of the register-provided-opcode instruction also specifies an immediate value representing another part of the opcode of the register-provided-opcode instruction; and in response to the register-provided-opcode instruction, the processing circuitry is configured to select the selected data processing operation in dependence on both the immediate value and the register-provided opcode.

15. The apparatus according to claim 1, in which, for a non-register-provided-opcode instruction specifying at least one source register:

the opcode is represented by a portion of the instruction encoding of the non-register-provided opcode instruction; and the data in the at least one source register is used as the at least one data operand and is not used as part of the opcode; and the register-provided-opcode instruction and the non-register-provided opcode instruction have different encodings for said portion of the instruction encoding.

16. The apparatus according to claim 1, in which part of the opcode of each instruction is specified by an instruction-encoded opcode represented in a predetermined portion of the instruction encoding;

none of a first subset of instructions having a first subset of values for the instruction-encoded opcode is said register-provided-opcode instruction; and for a second subset of instructions having a second subset of values for the instruction-encoded opcode, an immediate value specified in another portion of the instruction encoding from the instruction-encoded opcode specifies a further part of the opcode, and the register-provided-opcode instruction is one of said second subset of instructions for which the instruction-encoded opcode and the immediate value have one of a predetermined subset of values.

17. The apparatus according to claim 1, in which the processing circuitry is configured to process instructions according to a given instruction set architecture; and the register-provided-opcode instruction is a custom instruction having an encoding defined in the given instruction set architecture, for which the plurality of data processing operations comprise implementation-specific custom data processing operations not prescribed by the given instruction set architecture.

18. The apparatus according to claim 17, in which whether a given encoding of said custom instruction is decoded as the register-provided-opcode instruction or as a non-register-provided-opcode instruction is not prescribed by the given instruction set architecture.

19. A data processing method comprising:

decoding an instruction specifying an opcode and at least one data operand, to control processing circuitry to perform a data processing operation identified by the opcode on the at least one data operand, to generate a result value to be written to a destination register; and when the decoded instruction is a register-provided-opcode instruction specifying at least one source register:

at least part of the opcode is a register-provided opcode represented by a first portion of data stored in the at least one source register of the register-provided-opcode instruction;

the at least one data operand comprises data represented by a second portion of the data stored in the at least one source register;

in response to the register-provided-opcode instruction, the processing circuitry selects, based on at least the register-provided opcode, one of a plurality of different data processing operations supported for the same instruction encoding of the register-provided-opcode instruction; and said plurality of different data processing operations include at least two different data processing operations which are each capable, for at least a subset of possible input values for said at least one data operand, of generating the result value with a different value or a different data format to said at least one data operand.

20. A non-transitory, computer-readable storage medium storing a computer program, which when executed by a host data processing apparatus, causes the host data processing apparatus to simulate processing of a target program by target processing circuitry, the computer program comprising:

register emulating program logic to maintain a register emulating data structure emulating a plurality of registers of the target processing circuitry; and instruction decoding program logic to decode an instruction of the target program specifying an opcode and at least one data operand, to control the host data processing apparatus to perform a data processing operation identified by the opcode on the at least one data operand, to generate a result value to be written to part of the register emulating data structure corresponding to a destination register of said plurality of registers;

in which for a register-provided-opcode instruction specifying at least one source register:

at least part of the opcode is a register-provided opcode represented by a first portion of data corresponding to the at least one source register of the register-provided-opcode instruction;

the at least one data operand comprises data represented by a second portion of the data corresponding to the at least one source register;

in response to the register-provided-opcode instruction, the instruction decoding program logic is configured to control the host data processing apparatus to select, based on at least the register-provided opcode, one of a plurality of different data processing operations supported for the same instruction encoding of the register-provided-opcode instruction; and said plurality of different data processing operations include at least two different data processing operations which are each capable, for at least a subset of possible input values for said at least one data operand, of generating the result value with a different value or a different data format to said at least one data operand.

\* \* \* \* \*